Sept. 16, 1952 — L. W. CHILD — 2,610,798
VEHICLE HEATING APPARATUS
Filed Nov. 12, 1947 — 3 Sheets-Sheet 1
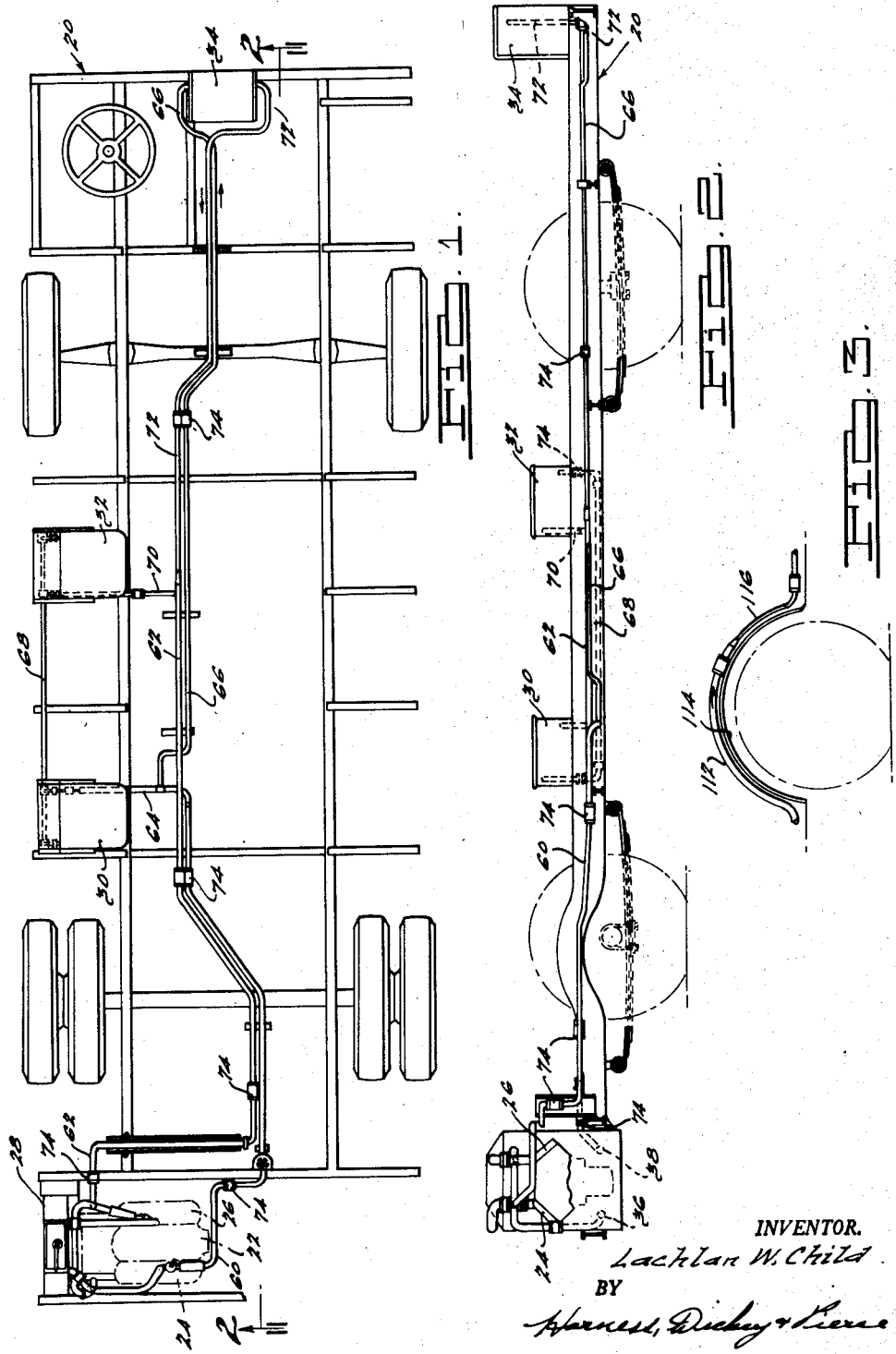
INVENTOR.
Lachlan W. Child
BY
Harness, Dickey & Pierce
ATTORNEYS.

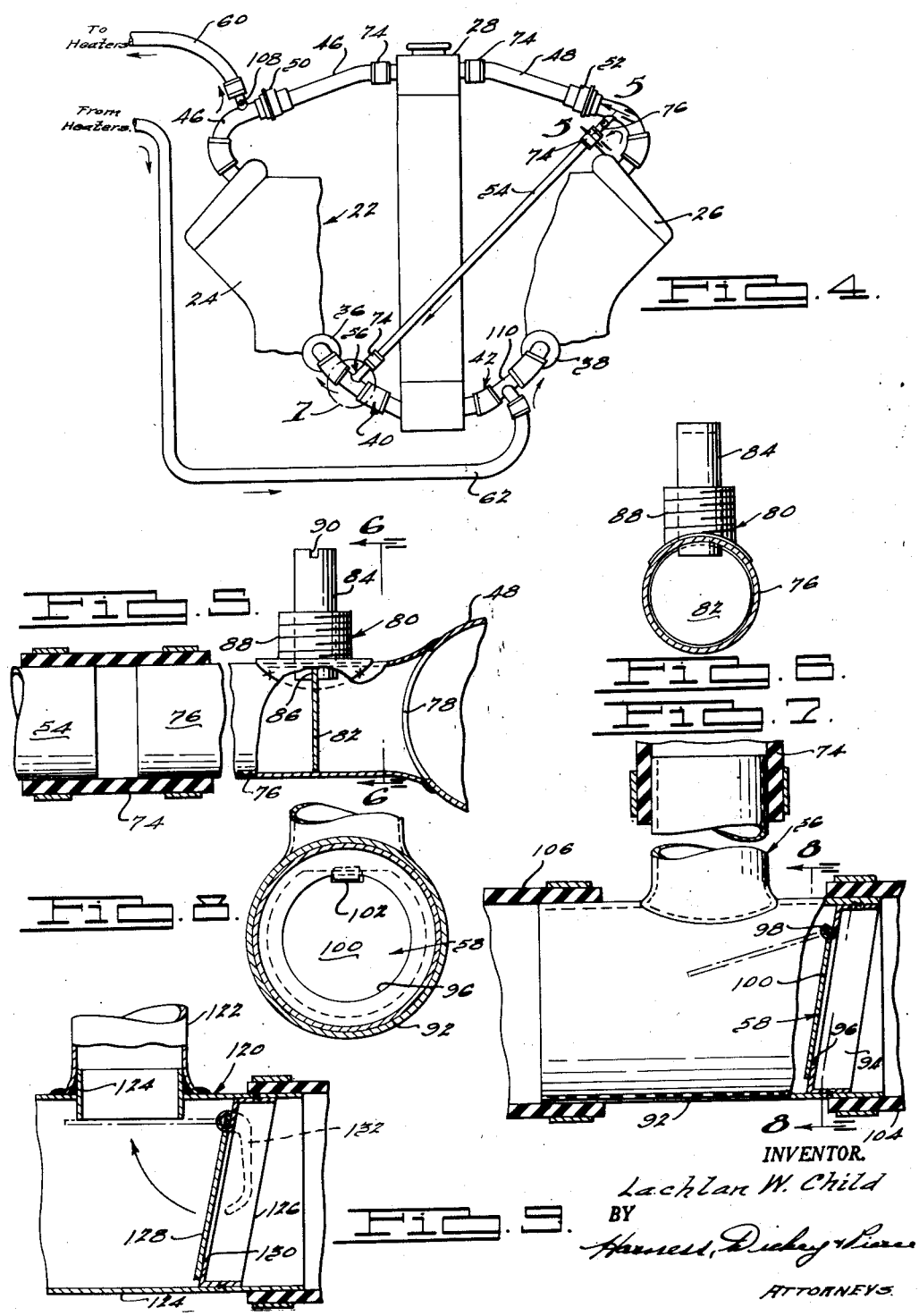

Sept. 16, 1952 L. W. CHILD 2,610,798
VEHICLE HEATING APPARATUS
Filed Nov. 12, 1947 3 Sheets—Sheet 3
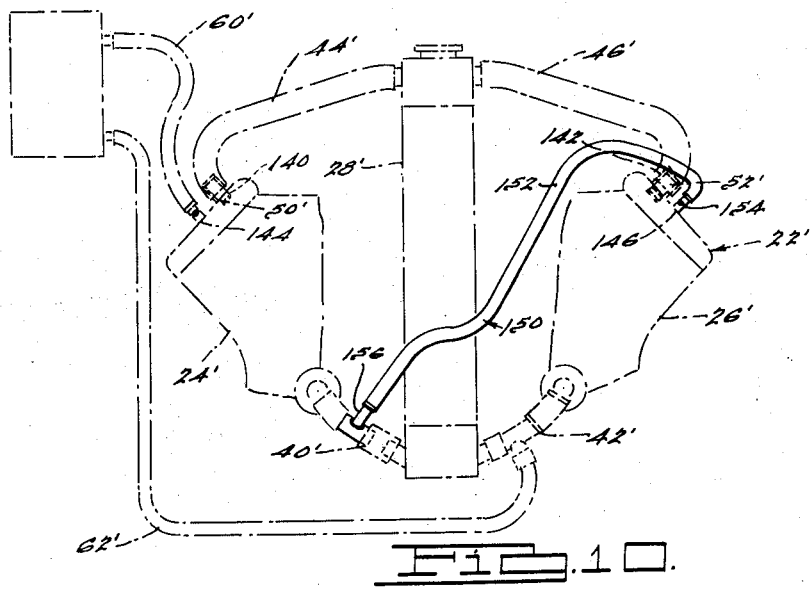
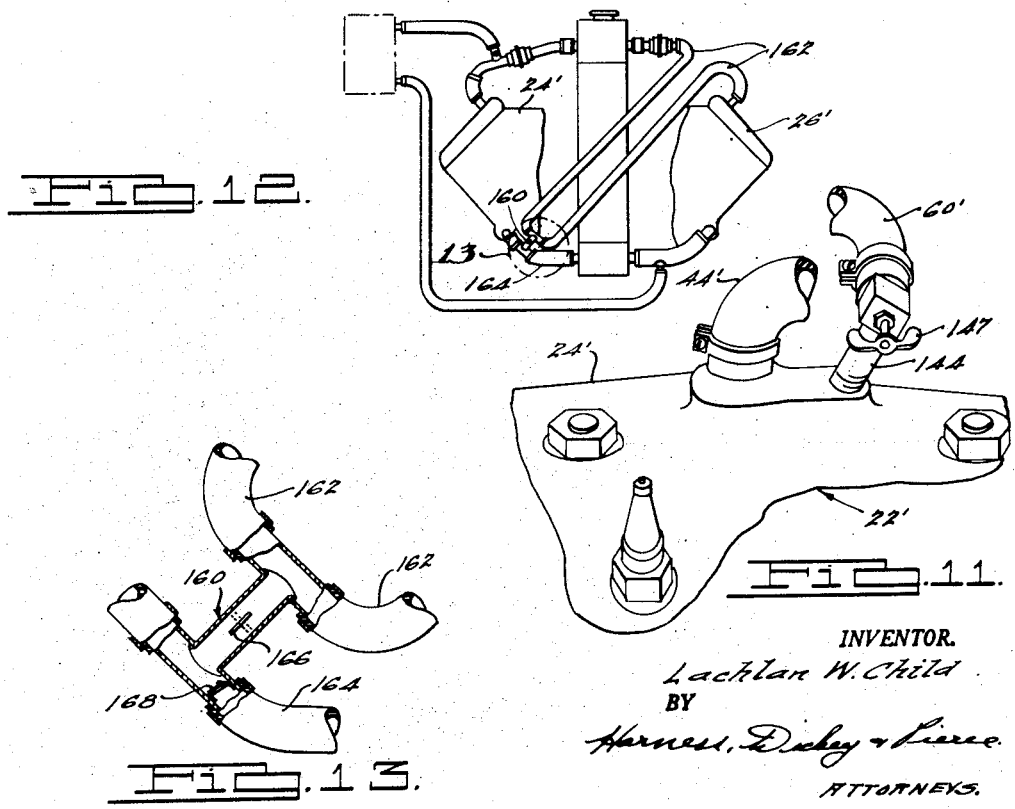
INVENTOR.
Lachlan W. Child
BY
Harness, Dickey & Pierce
ATTORNEYS.

Patented Sept. 16, 1952

2,610,798

UNITED STATES PATENT OFFICE 2,610,798

VEHICLE HEATING APPARATUS

Lachlan Wallace Child, Detroit, Mich., assignor to Evans Products Company, Plymouth, Mich., a corporation of Delaware Application November 12, 1947, Serial No. 785,370

19 Claims. (Cl. 237—8)

The present invention relates to heating apparatus and more particularly to an improved heating apparatus of the type employed in automotive vehicles for heating the interior of such vehicles through the use of the heat generated by the associated engine employed to propel the vehicle.

Heating apparatus of the above mentioned type are commonly called hot water heaters although they may employ any suitable liquid. In apparatus of this type the liquid passes through water jacket means associated with the engine where it picks up heat from the latter and then passes to heat transfer means adapted to transfer heat therefrom to the atmosphere within the vehicle.

It has been a common objection to heating apparatus of this type that it is slow to warm up; i. e., that there is too great a time lapse after the associated engine is started and before the water or other liquid of the apparatus is heated to a temperature at which it may transfer any substantial heat to the atmosphere within the vehicle. This difficulty is especially aggravated in heating apparatus employing a relatively large quantity of liquid. It will be appreciated that when this type of heating apparatus is used in connection with liquid cooled engines, the cooling liquid of the engine may be employed as the heat transfer medium of the heating apparatus and the quantity of liquid employed must be sufficient to adequately cool the engine. In engines having spaced banks of cylinders, as in those commonly called V-type engines, an unusually large quantity of such liquid is frequently employed, and consequently heating apparatus of the water heater type have been particularly slow to warm up when used with these engines. It has been conventional practice in V-type engines to employ parallel heat transfer circuits individual to the banks of cylinders thereof and including a common liquid reservoir or radiator, and pumps and heat exchange chambers individual to the banks of cylinders, and an auxiliary heat transfer means connected to one of these parallel heat transfer circuits for heating the atmosphere within the vehicle. Such systems include thermostats individual to the parallel circuits thereof and disposed intermediate the heat exchange chambers of the engine and the common reservoir. When these thermostats are closed, as during a warm-up period, the liquid circulated through the auxiliary heat transfer means or heater is permitted to pick up heat from only one of the banks of cylinders.

Also in all such hot water heater systems, and particularly those employed on large vehicles, such as buses, which often include multiple heater units spaced throughout the passenger carrying compartment, air frequently becomes entrapped in the liquid system and stops or substantially reduces the flow of liquid in the circuit and its removal causes considerable difficulty. Entrained air is inherent in any liquid system of this type which is vented to atmosphere and has numerous line connections. In vehicle heating systems, this entrained air collects and forms air locks at the heater core, and in the liquid lines at high points where there are syphon traps such for example as where the lines pass over wheel housings. This air collects at these points during periods when the vehicle is idle and if not scavenged by the apparatus automatically when the vehicle is put in operation, renders the heating apparatus completely or partially ineffective.

Accordingly, the principal objects of the invention are to provide an improved heating apparatus which is simple in construction, economical of manufacture and reliable and efficient in operation; to provide an improved heating apparatus the operation of which automatically and quickly scavenges any entrapped air from the system; to provide an improved hot water heating apparatus including simple and efficient means for altering the liquid circuit thereof to materially increase the liquid pressure effective to scavenge air from the apparatus; to provide an improved heating apparatus well adapted to overcome the relatively high resistance to liquid flow which is encountered in multiple heater systems which frequently require extensive liquid lines connecting the heaters, and to greatly improve the operating characteristics of such systems; to provide an improved heating apparatus for association with engine means including a plurality of banks of cylinders, which heating apparatus is peculiarly adapted to substantially reduce the warm-up time of the associated engine; to provide such a heating apparatus including means whereby standard equipment pump means is made to produce substantially increased liquid pressures in the apparatus thereby increasing the rate of flow of the liquid, facilitating the scavenging of entrapped air from air locks within the apparatus, and otherwise providing greatly improved operating characteristics; to provide (in a heating apparatus including liquid cooled engine means having a plurality of banks of cylinders having water jackets and liquid pump means individual thereto, liquid reservoir means, and means establishing parallel liquid circuits individual to said banks of cylinders) means for establishing a liquid circuit connecting the water jackets and pump means in series; to provide, in a heating apparatus of the hot water heater type, simple and efficient means for scavenging entrapped air from air locks which may develop in the apparatus; to provide, in such heating apparatus, an improved conduit arrangement adapted to cause the flowing liquid in the apparatus to entrain any air or other gases which have become entrapped to form air locks therein, and to carry it along through the whole system back into the radiator which is vented to the atmosphere, thus permitting this air to escape; and to generally improve the construction of heating apparatus of the above general type.

With the above as well as other and in certain cases more detailed objects in view, which will become apparent from the following description and the appended claims, preferred but illustrative embodiments are illustrated in the accompanying drawings throughout the several views of which corresponding reference characters designate corresponding parts, and wherein:

Figure 1 is a plan view of a vehicle chassis equipped with a heating apparatus embodying the invention;

Fig. 2 is a view in elevation of the structure illustrated in Fig. 1;

Fig. 3 is a broken view in elevation illustrating a fluid conduit constructed according to the invention passing over a wheel housing;

Fig. 4 is a broken diagrammatic view of the heating apparatus illustrated in Fig. 1;

Fig. 5 is an enlarged view in section of the structure illustrated in Fig. 4 taken substantially along the line 5—5 thereof;

Fig. 6 is a view in section of the structure illustrated in Fig. 5 taken substantially along the line 6—6 thereof;

Fig. 7 is an enlarged sectional view of that portion of Fig. 4 indicated by the dotted line circle 7;

Fig. 8 is a sectional view of the structure illustrated in Fig. 7 taken along the line 8—8 thereof;

Fig. 9 is a view in section similar to Fig. 7 illustrating a modification of the invention;

Fig. 10 is a diagrammatic view of another modification of the invention;

Fig. 11 is a broken view in perspective showing details of a portion of the structure illustrated diagrammatically in Fig. 10;

Fig. 12 is a diagrammatic view of still another modification of the invention; and Fig. 13 is an enlarged view partially in section of that portion of the structure illustrated in Fig. 12 indicated by the dotted circle 13.

It will be appreciated from a complete understanding of the invention that the improvements thereof may be embodied in heating apparatus of widely differing types and sizes and designed for numerous different specific applications.

It will be appreciated that in the broader aspects of the present invention any suitable heat sources may be employed and they may be entirely independent as in the case of separate engines. Also these heat sources may be connected by any suitable fluid conduit means to any desired heat transfer means which may comprise either a single heat transfer unit common to the heat sources, as in the conventional V-type engine in which a single radiator is common to the two cooling jackets, or the heat transfer means may comprise a plurality of heat transfer units each connected by the above-mentioned fluid conduit means to a single heat source. In its broader aspects, the present invention may include the combination of any such heat sources and heat transfer means in combination with additional heat transfer means and means for connecting said heat sources in series in a series circuit including the heat sources and the additional heat transfer means and bypassing the first mentioned heat transfer means.

The present invention is well adapted for multiple heater apparatus of the type normally employed in buses and the like. Such an application of the invention is illustrated in Figs. 1–8, inclusive, of the drawings. However, it will be appreciated that the present invention may also be employed to advantage in connection with only one heater core and in passenger automobiles and other vehicles. The heating apparatus illustrated in the drawings is shown mounted on a vehicle frame 20 which supports a heavy duty engine 22 having spaced banks of cylinders 24 and 26, mounted at the rear of the vehicle in a conventional manner, and having a radiator 28 associated therewith. Heater elements 30, 32 and 34 are spaced along the vehicle chassis in any desired manner and suitably supported thereon. The engine 22, the radiator 28, and the heater elements 30, 32 and 34 are connected by a plurality of conduits or lines as hereinafter more fully described.

The engine 22 is of a conventional V-type and includes fluid pumps 36 and 38 (Figs. 2 and 4) associated with the spaced banks of cylinders 24 and 26, respectively. The pumps 36 and 38 are connected, on their intake sides, to the lower portion of the radiator 28 by lines 40 and 42, respectively. The spaced banks of cylinders 24 and 26 are provided with conventional cooling jackets or chambers (not shown) connected to the pumps 36 and 38, respectively, and also connected, through return lines 44 and 46, respectively, to the radiator 28. Conventional thermostats 50 and 52 are provided in the lines 44 and 46, respectively, for controlling the flow of fluid therein. These thermostats do not establish bypass circuits when in their closed position.

The above construction, as thus far described, follows conventional design for water or fluid cooling of internal combustion engines. In this conventional practice, parallel cooling circuits individual to each bank of cylinders and each including the radiator 28 are established. The present invention contemplates a modification of this structure and the addition of new structure, by means of which the banks of cylinders 24 and 26 and their associated pumps 36 and 38 respectively are connected in series in a circuit which by-passes the radiator 28 during the warm-up period when the thermostats 50 and 52 remain closed. In one form, the foregoing is accomplished by means of a cross-over line 54, one end of which connects into the line 48 intermediate the cylinder bank 26 and the thermostat 52 and the other end of which is provided with the hereinafter described T fitting 56 one end of which is provided with a check valve 58 (see Fig. 7) disposed to prevent flow of fluid from the cross-over line 54 into the radiator through line 40. The T fitting 56 is connected into the line 40 by cutting a short section from the latter and connecting the free ends thereof to the opposite ends of the cross member of the T fitting, that portion of the line 40 leading to the radiator 28 being connected to the end of the T 56 carrying the check valve 58.

The water or other heat transfer medium is supplied to the heaters 30, 32 and 34 through a supply line 60 which connects into the upper line 46 intermediate the cylinder bank 24 and the thermostat 50. The water is returned from the heaters by means of a line 62 which connects into the lower line 42 which supplies fluid from the radiator 28 to the pump 38. It will be appreciated that, generically, any desired heater arrangement may be employed and that the heaters may be connected in any manner desired consistent with the various line and heater core resistances and with the fluid flow desired through each heater. In the preferred embodiment illustrated, the heaters 30 and 32 are connected in series, and the heater 34 is connected in parallel with the heaters 30 and 32. To effect this arrangement, the suppy ine 60, in the vicinity of the heater 30, divides into lines 64 and 66, the former leading to the heater 30 and the latter leading to the heater 34. The discharge port of the heater 30 is connected to the intake port of the heater 32 by a line 68, and the discharge port of the heater 32 is connected to the return line 62 by a line 70. The discharge port of the heater 34 is also connected to the return line 62 by a line 72.

It will now be appreciated that when the thermostats 50 and 52 are closed, as during the warm-up period when the engine is started up, the fluid circuit will include, in the following order, the pump 38, the water jacket of the cylinder bank 26, the line 48, the cross-over line 54, the line 40, the pump 36, the water jacket of the cylinder bank 24, the lines 46 and 60, the heaters, the return line 62, and the line 42 which connects to the intake side of the pump 38. It will be noted from a consideration of the above recited circuit that the water or other cooling medium passes from the pump 38 through the cylinder bank 26 and to the line 40 by means of the cross-over line 54. The line 40 is thus directly connected to the discharge side of the pump 38 and the pressure thereof is effective to close the check valve 58 and cause the liquid to flow through the line 40 to the intake side of the pump 36 rather than through the valve 58 and to the radiator. Consequently, the pressure applied to the heater supply line 60 is therefore the combined effective pressure of the pumps 36 and 38 connected in series, and further that the water or other heat transfer medium goes to the heater supply line 60 after passing through the cylinder banks 26 and 24 in series and absorbing heat increments from each.

It will thus be seen that the heaters are supplied with hotter water and more of it than in conventional apparatus in which, when the thermostats are closed, the fluid circuit through the heaters includes the water jacket of only one of the cylinder banks. Consequently, the present invention greatly decreases the time required to get heat from the apparatus when the engine is started up cold. Also, in cold weather the thermostats 50 and 52 may remain almost closed, thereby maintaining a circuit substantially the same as that above described which exists during the warm-up period. To the extent that the thermostats 50 and 52 are open, a mixture of circuits results, a part of the liquid moving in the above described series circuit and the remainder moving in the conventional parallel circuits above mentioned.

Considering certain of the above described elements in greater detail, the various conduit lines, with certain exceptions hereinafter noted, are preferably formed of metal tubing which may be interrupted and connected as desired by means of conventional coupling devices 74.

The cross-over line 54 is connected into the line 48, as above mentioned, by means of a butterfly valve tube section 76 illustrated in detail in Figs. 5 and 6. One end of the tube section 76 is coupled to one end of the cross-over tube 54 by one of the conventional rubber coupling devices 74 mentioned above. The other end of the tube section 76 is flared to fit the line 48 and is brazed or otherwise suitably secured thereto, the line 48 being cut away to form the aperture 78 and thereby establish communication between the line 48 and the tube 76.

Intermediate its ends, the tube section 76 is provided with a butterfly valve 80 comprising a disk 82 of a diameter substantially equal to the internal diameter of the tube 76, and the position of which is controlled by a valve stem 84. The inner end of the valve stem 84 is slotted as indicated at 86 to operatively engage the valve disk 82 and its outer end is provided with a slot 90 for actuation by any suitable means. Intermediate its ends the stem 84 is mounted in a sleeve 88 brazed or otherwise suitably secured to the tube section 76.

The valve 80 permits the cross-over line 54 to be opened during cold wheather when the heaters are in use, when a maximum of heat and pressure is desired in the heater supply line 60, and to be closed during warm weather when the heaters are not in use and a maximum cooling action of the radiator fluid is desired. It will be appreciated that in hot weather when the valve 80 is closed the conventional parallel cooling circuits individual to the cylinder banks 24 and 26 each including the radiator 28 are established, the thermostats 50 and 52 remaining open. When the valve 80 is open, or in the absence of a valve 80, a part of the fluid, depending on the extent to which the thermostats 50 and 52 are open, which is pumped through the cylinder bank 26 by the pump 38 will pass through the cross-over line 54 and to the intake side of the pump 36 with the result that a part of the cooling fluid supplied to the cylinder bank 24 will be at a higher initial temperature than that supplied to the cylinder bank 26, which will in turn cause the cylinder bank 24 to run at a higher temperature than the bank 26. This temperature differential is relatively small during warm-up periods, cold weather operation during which the thermostats are only partially open, and normal warm weather operation during which the load on the engine is not sufficient to cause a substantial increase in its operating temperature. Under these conditions this temperature is not materially greater than that frequently found to exist in engines of this type having the above mentioned parallel circuit cooling system. However, under conditions causing the engine to operate at substantially increased temperatures, as for example when operating under heavy loads, the temperature differential would be substantially increased and might produce serious ill effects. This difficulty is eliminated by the provision of the valve 80 which may be closed when conditions exist causing the engine to operate at materially increased temperatures, thereby reestablishing the conventional circuits and obtaining the maximum cooling of both banks of the engines.

From the above considerations it will be appreciated that although, as above described, the cross-over line 54 preferably includes a butterfly valve 80, the latter valve may be omitted on passenger car installations. The absence of this valve means, although it may cause one cylinder bank to run slightly warmer than the other, will not cause any injurious overheating of the engine in passenger car installations.

At its opposite end, the cross-over line 54 is provided with the above mentioned T fitting 56 which is illustrated in detail in Figs. 7 and 8. The check valve 58, mounted in one end of the cross bar 92 of the fitting, includes a cup-shaped valve seat 94 the walls of which have an external diameter substantially equal to the internal diameter of the cross member 92 of the T and is received therein and welded or otherwise suitably secured thereto. The base of the cup-shaped valve seat 94 has an aperture 96 formed centrally thereof and is preferably inclined relative to the axis of the tube 92 in which it is fitted, in the manner illustrated in Fig. 7. A portion of the cup-shaped valve seat 94 adjacent to the aperture 96, and at the axially outermost point thereof, is reversely bent inwardly, forming a hook 98 for hingedly supporting a valve disk 100 adapted to seat against the inner surface of the valve seat 94 when in the closed position and to pivot about the supporting hook 98 and inwardly of the tube 92 to the open position illustrated in broken lines in Fig. 7. The valve disk 100 is adapted to cover the aperture 96 when in the closed position and is provided with an aperture 102 which is adapted to receive the supporting hook 98 and is disposed and shaped to permit free pivotal movement of the valve disk 100 while preventing it from falling off the hook. The valve seat 94 is preferably secured in a position in which, when assembled in the complete apparatus, the force of gravity acts to maintain the valve disk 100 in its closed position.

As mentioned above, the end of the cross member 92 of the T fitting 56 in which the check valve 58 is secured is connected to the lower portion of the radiator 28, and the opposite end of the cross member 92 is connected to the intake side of the pump 36. This construction provides a simple and efficient check valve mechanism preventing flow of cooling fluid from the cross connection line 54 into the radiator 28 through the line 40 while permitting the flow of fluid from the radiator 28 to the pump 36 through the line 40 when the cross connection 54 is shut off as by closing the valve 80, or to supplement the fluid supplied through the cross-over line 54 when the valve 80 is open.

The heater supply line 60 is connected into the line 46 in the same manner as the cross-over line 54 is connected into the line 48 and is provided with a butterfly valve 108 of the same construction as the butterfly valve 80 described above. The return line 62 from the heaters is connected to a T section 110 provided in the line 42 for this purpose.

In addition to providing an increased pressure in the heater supply lines in the manner above described, the present invention also facilitates the scavenging of air from the heater cores and other air locks in the apparatus by the provision of means disposed on the outlet side of such air locks for locally increasing the velocity of the cooling fluid and thereby facilitating the entrainment of the air entrapped in the air locks and its eventual return to the radiator. The foregoing is accomplished by providing a restriction at the discharge side of the heater core or other air lock, of such proportions that air entrained in the fluid will be carried downwardly and into the lines rather than permitted to rise through the fluid and collect in the air lock. This restriction preferably should begin at the point from which it is desired to remove the air and should be so proportioned to the slope of the line and to the diameter of the line at the air lock as to entrain the air collected at the air lock and remove the same therefrom. The restriction should preferably extend throughout the downhill slope of the line leading from the air lock to prevent the formation of an air lock at the point of termination of the restriction. Considering the flow behavior of air bubbles once entrained, in an uphill-sloped pipe the lighter air or gas tends to rise and to flow along with the liquid, contrarily, on a downhill slope the lighter gas tends to rise and flow against the liquid current. It is often desirable to have the whole heater system, both inlet and outlet pipes of minimum restriction for a given cost of piping, connections, etc., in order to get maximum heating flow. To achieve this and also to always have sufficient velocity at all points in the conduits to entrain or to carry along already entrained air with the liquid flow, the portions of the conduit including the downhill slopes are according to this invention of smaller diameter piping or conduit than the portions of conduit which are substantially horizontal or uphill slopes (except where it is desirable or convenient to use smaller diameter pipe or fittings in the uphill slopes to give restriction to help proportion or divide the flow between several heaters or the like).

In the heating apparatus illustrated in Figs. 1 and 2, the desired air scavenging effect is obtained by forming the following lines of slightly smaller diameter than the others: The line 68 leading from the outlet port of the heater 30 to the inlet port of the heater 32; the line 70 leading from the heater 32 to the return line 62; and the line 72 leading from the heater 34 to the return line 62. By way of illustration, it has been found satisfactory, in the heating apparatus there illustrated, to form the supply and return lines 60, 64 and 62 of 1⅜" tubing and to form the lines 68, 70 and 72 of 1" tubing.

Such restrictions are particularly effective in systems where it is necessary that the lines pass over wheel housings and the like, as illustrated in Fig. 3, where air locks frequently occur. Referring to Fig. 3, an illustrative conduit line 112 is deformed to pass over a wheel housing 114. Scavenging of any air which may become entrapped at the high point of the line is accomplished by the provision of a restricted line portion 116 coupled into the line adjacent the high point thereof and extending throughout the downward sloping portion of the line. The proportions of the restricted line portion 116 are determined empirically and depend upon the slope of the line 116, the diameter of the line 112, and the normal rate of flow in the line 112. The resulting restriction must be such that the fluid moving through that portion of the line moves downwardly at a greater rate than that at which the air bubbles entrained in the fluid rise relative thereto, or in other words, such that the movement of the air bubbles is along the line in the direction of the flow of the fluid.

Fig. 9 illustrates a modification of the invention which may be employed in place of the above described T section 56. The T fitting 120 illustrated in Fig. 9 differs from the fitting 56 in the following respects. The upright section 122 thereof is provided with a short extension 124 welded or otherwise secured therein and extending into the cross member 124 of the T section 120. A valve seat 126 similar to the valve seat 94 carries a valve disk 128 pivotally mounted thereon and adapted for movement between a first position in which it closes an aperture 130 formed in the valve seat 126 and a second position in which it covers the open end of the extension 124 of the upright portion 122 of the T fitting, as illustrated in broken lines in Fig. 9. A crank 132 disposed outwardly of the valve disk 128 is pivotally mounted on the valve seat 126 and provided with any suitable actuating means (not shown) disposed externally of the T fitting 120 and operable to move the valve disk 128 from the first position to the second position and releasably hold it in the second position.

It will thus be appreciated that the valve 128 in this construction combines the functions of the butterfly valve 80 and the check valve 58. In the broken line position illustrated in Fig. 9, it functions to close the cross-over line, and in the position there illustrated in full lines the cross-over line is open and the valve 128 serves the check valve function of the valve 58.

The present invention also contemplates the provision of a conversion unit, for use with conventional V type engines having a pair of heat exchange chambers, a radiator, fluid conduit lines establishing parallel fluid circuits individual to the chambers and including the radiator, and fluid pumps and thermostats individual to the circuits. In the broader aspects of the present invention this conversion unit may comprise any suitable means for interconnecting these two circuits and establishing a circuit which bypasses the radiator and the thermostats and connects in series the exchange chambers and the fluid pumps. The conversion unit may include any suitable means for closing this interconnecting means and also may include any suitable means for preventing the circulating fluid from flowing from the interconnecting means in the wrong direction in the second circuit and thence to the radiator.

The construction illustrated in Figs. 10 and 11 is adapted for converting a conventional passenger car heating apparatus of the type including a pair of spaced cylinder banks, pump means individual thereto, and means defining parallel fluid circuits individual to the cylinder banks, to a heating apparatus in which the cylinder banks and associated pump means are connected in series.

The passenger engine 22' is generally similar to the heavy duty engine 22 of the embodiment illustrated in Fig. 4 and is provided with an associated radiator 28" and connected thereto by lower radiator lines 40" and 42' and upper radiator lines 44' and 46" which are preferably formed of hose of any suitable composition. The engine 22' also has spaced cylinder banks 24" and 26'; which in accordance with conventional construction in engines of this type are provided with risers 140 and 142 respectively, which in addition to serving as connections for the upper radiator hoses 44' and 46' also serve to support the thermostats 50' and 52'. Also the cylinder banks are provided with conventional outlet ports 144 and 146 disposed adjacent the risers 140 and 142 which permit the establishing of fluid circuits through the cylinder banks which bypass the thermostats 50' and 52'. These ports and the connections thereto are illustrated diagrammatically in Fig. 10. The details of construction are conventional and may follow the illustrative embodiment shown in Fig. 11, it being understood that the cylinder bank 26" may be of similar construction.

In conventional heating apparatus the heater supply line 60" is connected to the port 144 in the cylinder bank 24" through a valve 147, and the return line 62" is connected into the lower radiator hose 40" leading from the radiator to the bank 24". The above mentioned conversion is effected by disconnecting the heater return line 62" from the hose 40" and connecting it into the lower hose 42' and installing the conversion unit 150 illustrated in full lines in Fig. 10. This unit 150 performs the same function as the cross-over connection 54 and comprises a hose 152 having a valve fitting 154 mounted in the upper end thereof and adapted for connection to the port 146. At its lower end the hose 152 carries a T fitting 156 which is preferably of the same construction as the T fitting 56 described above, the details of which are illustrated in Figs. 7 and 8. The T fitting 156 is connected into the lower hose 40" in the same manner as the fitting 56, namely, by cutting a short section therefrom and connecting the opposite ends of the cross member of the T to the open ends of the hose 40" so that the end of the T carrying the check valve is connected to the radiator 28", as in the construction illustrated in Fig. 4.

It will be appreciated that, for the reasons above stated, the conversion unit may also be used with no valve in the fitting 154, for installation on engines, e. g. most conventional passenger car engines, which do not operate under conditions causing them to run at temperatures substantially higher than normal. Also it will be appreciated that the T fitting 156 of the conversion unit 150 may be of a construction similar to that illustrated in Fig. 9 and described above. If this construction is used it will be apparent that no valve is required in the fitting 154.

From a consideration of the above described construction of the conversion unit 150, it will be appreciated that by the above described conversion a heating apparatus is provided, the circuits and operation of which are the same as the construction illustrated in Figs. 1 to 8.

The modification illustrated in Figs. 12 and 13 differs from the above described embodiment illustrated in Fig. 4 in that the cross-over line 54 thereof is replaced and the function thereof is performed by a short H-shaped fitting 160. This is made possible by replacing the upper radiator line 48 with a line 162 which leads from the cylinder bank to the vicinity of a line 164 corresponding to the line 40 in the embodiment illustrated in Fig. 4 and then through the thermostat and into the upper portion of the radiator. At a point adjacent the line 164, the line 162 is interrupted and connected to opposite ends of one leg of the H-shaped fitting 160. The other leg of the fitting 160 is preferably provided with a check valve 168 in one end thereof which may be of the same construction as the check valve 58. The line 164 comprises a radiator section connecting the radiator to the end of the fitting having the check valve 168 therein, and an engine section connected to the other end of the fitting 160. A butterfly valve 166 is disposed centrally of the cross member of the fitting 160 and may be of the same construction as the above described butterfly valve 80. It will now be apparent that this construction permits the same circuits and resulting improved operating characteristics as the above described constructions.

Of course, this construction illustrated in Figs. 12 and 13 may also be employed as a conversion unit in which event the unit would include the hose 162 and the fitting 160 in their assembled relation, and would be installed by replacing the line 48 with the line 162, and breaking the line 40 and connecting the ends thereof to the fitting 160, the radiator portion thereof being connected to the end of the fitting 160 containing the check valve 168.

While only several specific embodiments of the invention have been illustrated and decribed in detail, it will be readily apparent to those skilled in the art that numerous modifications and changes may be made without departing from the spirit of the invention or from the scope of the appended claims.

What is claimed is:

1. A space heating apparatus comprising a liquid cooled engine including first and second engine cooling chambers associated therewith, waste heat dissipating means connected to said engine cooling chambers, liquid conduit means connecting said engine cooling chambers and said waste dissipating heat transfer means, a space heater comprising heat transfer means, means including conduits for establishing a liquid circuit connecting in series said first chamber, said second chamber, and said heat transfer means, and means for preventing liquid flow other than in series in said last named circuit.

2. A space heating apparatus comprising liquid cooled engine means including first and second engine cooling heat exchange chambers associated therewith, waste heat dissipating liquid reservoir means, means providing parallel liquid flow circuits individual to said chambers and each including said reservoir means, a space heater comprising heat transfer means, and means for establishing a liquid circuit which bypasses said reservoir means and connects in series said first chamber, said second chamber and said heat transfer means.

3. A space heating apparatus as defined in claim 2 including thermostatically actuated flow control valve means to proportion flow between said parallel liquid flow circuits and said series liquid circuit.

4. A space heating apparatus as defined in claim 2 wherein each of said parallel liquid flow circuits includes liquid temperature responsive flow control valve means to proportion flow between said parallel liquid flow circuits and said series liquid circuit.

5. A space heating apparatus as defined in claim 2 wherein said last named means includes a valve operable to selectively permit and prevent said bypassing of the reservoir means and connecting in series of said first chamber, said second chamber and said heat transfer means.

6. A space heating apparatus comprising liquid cooled engine means including first and second engine cooling heat exchange chambers associated therewith, waste heat dissipating liquid reservoir means, means providing parallel liquid flow circuits individual to said chambers and each including said reservoir means, liquid pump means individual to said liquid flow circuits, a space heater comprising heat transfer means, and means for establishing a liquid flow circuit which bypasses said liquid reservoir means and connects in series said first chamber, said second chamber, both said liquid pump means and said heat transfer means.

7. A space heating apparatus including a liquid cooled internal combustion engine having first and second banks of cylinders and first and second cooling chambers respectively associated therewith, a radiator, liquid supply and return lines individual to said chambers and connecting the latter to said radiator to provide parallel liquid flow circuits individual to said chambers, liquid pumps individual to said circuits, a heater, conduit means connecting the inlet of said heater to the outlet of said first chamber and connecting the outlet of said heater to the inlet of said second chamber, and means for establishing a liquid flow circuit which by-passes said radiator and connects in series said first chamber, said second chamber, both said liquid pumps and said heater, said last named means comprising a conduit one end of which communicates with the outlet of said second chamber, a fitting mounted on the other end of said conduit and having a pair of ports one of which communicates with said radiator and the other of which communicates with said first chamber, and valve means for controlling the flow of liquid through said one of said ports.

8. A space heating apparatus, as defined in claim 7, wherein said valve means includes a valve mounted in said fitting and movable between a first position in which it is effective to prevent flow of liquid through said conduit and a second position in which it is effective to control the flow of liquid through said one of said ports.

9. A space heating apparatus, as defined in claim 7, wherein said valve means includes a first valve for controlling the flow of liquid through said conduit and a second valve mounted in said fitting for controlling the flow of liquid through said one of said ports.

10. A space heating apparatus, as defined in claim 7, wherein said means for establishing a liquid flow circuit includes a generally H-shaped fitting, one side of which is connected into and forms a part of the return line of said second chamber and the other side of which is connected into and forms a part of the supply line of said first chamber, said fitting having a shut-off valve operable to open and close the central portion connecting the opposite sides thereof, and a check valve effective to prevent the flow of liquid from said central portion through said supply line of the said first chamber toward said radiator.

11. For use in a space heating apparatus including liquid cooled engine means having engine cooling chambers associated therewith and a space heater operatively connected thereto, a radiator, means providing parallel liquid flow circuits through said radiator individual to said chambers, and liquid pumps individual to said circuits, a conversion unit adapted to connect said pumps in series to add their pressure heads across said space heater for more effective heating and comprising means defining a liquid conduit, means disposed at one end of said conduit providing a pair of ports communicating with said conduit, one of which ports is adapted for connection to said radiator and the other of which is adapted for connection to the intake side of one of said pumps, and valve means mounted on said first named means for controlling the flow of liquid through said one of said ports.

12. For use in a space heating apparatus including liquid cooled engine means having engine cooling chambers associated therewith and a space heater operatively connected thereto, a radiator, means providing parallel liquid flow circuits through said radiator individual to said chambers, and liquid pumps individual to said circuits, a conversion unit adapted to connect said pumps in series to add their pressure heads across said space heater for more effective heating and comprising a liquid conduit, a fitting mounted on one end of said conduit having a pair of ports communicating with said conduit, one of which ports is adapted for connection to said radiator and the other of which is adapted for connection to the intake side of one of said pumps, said one of said ports having a check valve associated therewith effective to prevent the flow of liquid from said conduit through said one of said ports.

13. For use in a space heating apparatus including liquid cooled engine means having engine cooling chambers associated therewith and a space heater operatively connected thereto, a radiator, means providing parallel liquid flow circuits through said radiator individual to said chambers, and liquid pumps individual to said circuits, a conversion unit adapted to connect said pumps in series to add their pressure heads across said space heater for more effective heating and comprising means defining a liquid conduit, a shut-off valve carried by said last named means and operable to open and close said conduit, and means disposed at one end of said conduit providing a pair of ports communicating with said conduit, one of which ports is adapted for connection to said radiator and the other of which is adapted for connection to the intake side of one of said pumps, said one of said ports having check valve means associated therewith effective to control the flow of liquid through said one of said ports.

14. For use in a space heating apparatus including liquid cooled engine means having engine cooling chambers associated therewith and a space heater operatively connected thereto, a radiator, means providing parallel liquid flow circuits individual to said chambers, and liquid pumps individual to said circuits, a conversion unit adapted to connect said pumps in series to add their pressure heads across said space heater for more effective heating and comprising a liquid conduit, a fitting mounted on one end of said conduit having a pair of ports communicating with said conduit, one of which ports is adapted for connection to said radiator and the other of which is adapted for connection to the intake side of one of said pumps, and a valve mounted in said fitting and movable between a first position in which it is effective to prevent the flow of fluid through said conduit and a second position in which it is effective to control the flow of liquid through said one of said ports.

15. For use in a space heating apparatus including liquid cooled engine means having first and second engine cooling chambers associated therewith and a space heater operatively connected thereto, a radiator, liquid supply and return lines individual to said chambers and connecting the latter to the radiator to provide parallel liquid flow circuits through said radiator, and first and second liquid pumps individual to said circuits, a conversion unit adapted to connect said pumps in series to add their pressure heads across said space heater for more effective heating and comprising a conduit adapted to replace the return line of said first chamber, and an H-shaped fitting one side of which is connected into and forms a part of said conduit and the other side of which is adapted to be connected into and form a part of the supply line of said second chamber, said fitting having a valve operable to open and close the central portion connecting the opposite sides of said fitting, said fitting also having a check valve mounted in said other side thereof for preventing the flow of liquid from said central portion through said supply line of said second chamber in a direction toward said radiator.

16. For use in apparatus including a waste engine-heat liquid heat exchanger for heating a vehicle having an engine with two separate engine cooling passages each with its own liquid circulating pump, the two cooling passages with their associated circulating pumps being in parallel with each other but normally each being in series with a common radiator; a conversion attachment comprising in combination conduit means adapted to connect said separate passages with their pumps in series with said heat exchanger, and valve means to selectively permit and prevent vehicle heating flow through said conduit means.

17. The conversion attachment of claim 16 including valve means preventing short circuit flow of either pump about the other.

18. The conversion attachment of claim 16 including one-way check valve means preventing short circuit flow of either pump about the other.

19. For use in an apparatus including a waste engine-heat liquid heat exchanger for heating a vehicle having an engine with two separate engine cooling passages, each with its own liquid circulating pump, the two cooling passages with their associated circulating pumps being in parallel with each other but normally each being in series with a common radiator; a conversion attachment comprising in combination conduit means adapted to connect said separate passages with their pumps in series with said heat exchanger, and a one way check valve operatively connected to said conduit means for preventing short circuit flow of either pump about the other.

LACHLAN WALLACE CHILD.

REFERENCES CITED

The following references are of record in the file of this patent:

UNITED STATES PATENTS

| Number | Name | Date |
|---|---|---|
| 1,828,978 | Moe | Oct. 27, 1931 |
| 2,105,193 | Kysor | Jan. 11, 1938 |
| 2,259,341 | Hans | Oct. 14, 1941 |
| 2,282,675 | Pigott | May 12, 1942 |
| 2,413,770 | Knoy | Jan. 7, 1947 |